(12) United States Patent
Fung et al.

(10) Patent No.: US 9,352,751 B2
(45) Date of Patent: May 31, 2016

(54) SYSTEM AND METHOD FOR DETERMINING THE INFORMATION TRANSFER RATE BETWEEN A DRIVER AND VEHICLE

(71) Applicant: Honda Motor Co., Ltd., Tokyo (JP)

(72) Inventors: Kin C. Fung, Dublin, OH (US);
Timothy J. Dick, Dublin, OH (US);
Charles William Hall, Jr., Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/573,778

(22) Filed: Dec. 17, 2014

(65) Prior Publication Data

US 2015/0367858 A1 Dec. 24, 2015

Related U.S. Application Data

(60) Provisional application No. 62/016,020, filed on Jun. 23, 2014.

(51) Int. Cl.
*G05D 1/00* (2006.01)
*B60W 50/04* (2006.01)
*B60Q 9/00* (2006.01)
*G01S 19/13* (2010.01)

(52) U.S. Cl.
CPC ............. *B60W 50/04* (2013.01); *B60Q 9/00* (2013.01); *G01S 19/13* (2013.01); *B60W 2540/00* (2013.01)

(58) Field of Classification Search
CPC ............. G07C 9/00158; G06F 21/32; H04N 21/25841; G08G 1/096775; H04W 48/04; H04W 48/06

USPC ........ 701/1, 36, 41, 70, 29.1; 705/4; 340/439, 340/901; 180/272
See application file for complete search history.

(56) References Cited

U.S. PATENT DOCUMENTS

| | | |
|---|---|---|
| 5,191,524 A | 3/1993 | Pincus et al. |
| 6,061,610 A | 5/2000 | Boer |
| 6,876,949 B2 | 4/2005 | Hilliard et al. |
| 7,839,292 B2 | 11/2010 | Wang et al. |
| 8,315,757 B2 | 11/2012 | Yamamura et al. |
| 2004/0088095 A1 | 5/2004 | Eberle et al. |
| 2005/0155808 A1 | 7/2005 | Braeuchle et al. |

(Continued)

FOREIGN PATENT DOCUMENTS

| | | |
|---|---|---|
| RU | 2298215 | 4/2007 |
| WO | 2013113947 | 8/2013 |

OTHER PUBLICATIONS

International Search Report and Written Opinion of PCT/US2015/037019 dated Nov. 2, 2015, 12 pages.

*Primary Examiner* — Gertrude Arthur Jeanglaud
(74) *Attorney, Agent, or Firm* — Rankin, Hill & Clark LLP

(57) ABSTRACT

A method and a system for determining an information transfer rate between a driver and a vehicle, where the information transfer rate is calculated using driver information measured directly from the driver and vehicle information measured directly from the vehicle. The method also includes retrieving a baseline information transfer rate for maintaining control of the vehicle from a baseline information transfer rate database. A driver safety factor is calculated using the information transfer rate and the baseline information transfer rate.

20 Claims, 6 Drawing Sheets

(56) References Cited

U.S. PATENT DOCUMENTS

| | | |
|---|---|---|
| 2007/0159344 A1 | 7/2007 | Kisacanin |
| 2012/0123806 A1* | 5/2012 | Schumann, Jr. .. G08G 1/096775 705/4 |
| 2012/0290215 A1 | 11/2012 | Adler et al. |
| 2013/0158741 A1 | 6/2013 | Hahne |
| 2013/0245886 A1 | 9/2013 | Fung et al. |
| 2014/0309789 A1* | 10/2014 | Ricci .................... H04W 48/04 700/276 |
| 2014/0309893 A1* | 10/2014 | Ricci .................... H04W 48/04 701/49 |

* cited by examiner

SYSTEM AND METHOD FOR DETERMINING THE INFORMATION TRANSFER RATE BETWEEN A DRIVER AND VEHICLE

RELATED APPLICATIONS

This application claims priority to U.S. Provisional Application Ser. No. 62/016,020, filed on Jun. 23, 2014, which is expressly incorporated herein by reference.

BACKGROUND

A constant flow of information from a driver to a vehicle is required in order for the driver to maintain control of the vehicle. The driver maintains control of the vehicle, for example, by transmitting information to the vehicle through the steering wheel, accelerator and brakes to produce appropriate changes in vehicle acceleration, velocity, lane position, and direction. A reduction in the flow of information from the driver to the vehicle, such as due to driver impairment, can result in a reduction or loss of vehicular control.

BRIEF DESCRIPTION

According to one aspect, a computer implemented method for determining an information transfer rate between a driver and a vehicle includes measuring driver information directly from the driver, measuring vehicle information directly from the vehicle and calculating an information transfer rate between the driver and the vehicle using the driver information measured directly from the driver and the vehicle information measured directly from the vehicle. The method includes retrieving a baseline information transfer rate for maintaining control of the vehicle from a baseline information transfer rate database, and calculating a driver safety factor using the information transfer rate between the driver and the vehicle and the baseline information transfer rate.

According to another aspect, a non-transitory computer-readable medium storing executable code for determining an information transfer rate between a driver and a vehicle is provided. The code, when executed, performs the steps of measuring driver information directly from the driver, measuring vehicle information directly from the vehicle and calculating an information transfer rate between the driver and the vehicle using the driver information measured directly from the driver and the vehicle information measured directly from the vehicle. The method includes retrieving a baseline information transfer rate for maintaining control of the vehicle from a baseline information transfer rate database and calculating a driver safety factor using the information transfer rate between the driver and the vehicle and the baseline information transfer rate.

According to yet another aspect, an information transfer rate system for determining an information transfer rate between a driver and a vehicle is provided. The system includes a computer processor and a computer readable storage medium storing executable code. The code, when executed by the computer processor, performs the steps of measuring driver information directly from the driver using a driver information sensing device, measuring driver information directly from the vehicle using a vehicle information sensing device of the vehicle, and calculating an information transfer rate between the driver and the vehicle using the driver information measured directly from the driver and the vehicle information measured directly from the vehicle, wherein the information transfer rate is calculated using an information transfer rate module of the information transfer rate system. The method includes retrieving a baseline information transfer rate for maintaining control of the vehicle from a baseline information transfer rate database of the information transfer rate system, and calculating a driver safety factor using the information transfer rate between the driver and the vehicle and the baseline information transfer rate, wherein the driver safety factor is calculated using a driver safety factor module of the information transfer rate system.

DETAILED DESCRIPTION

Figure 1:
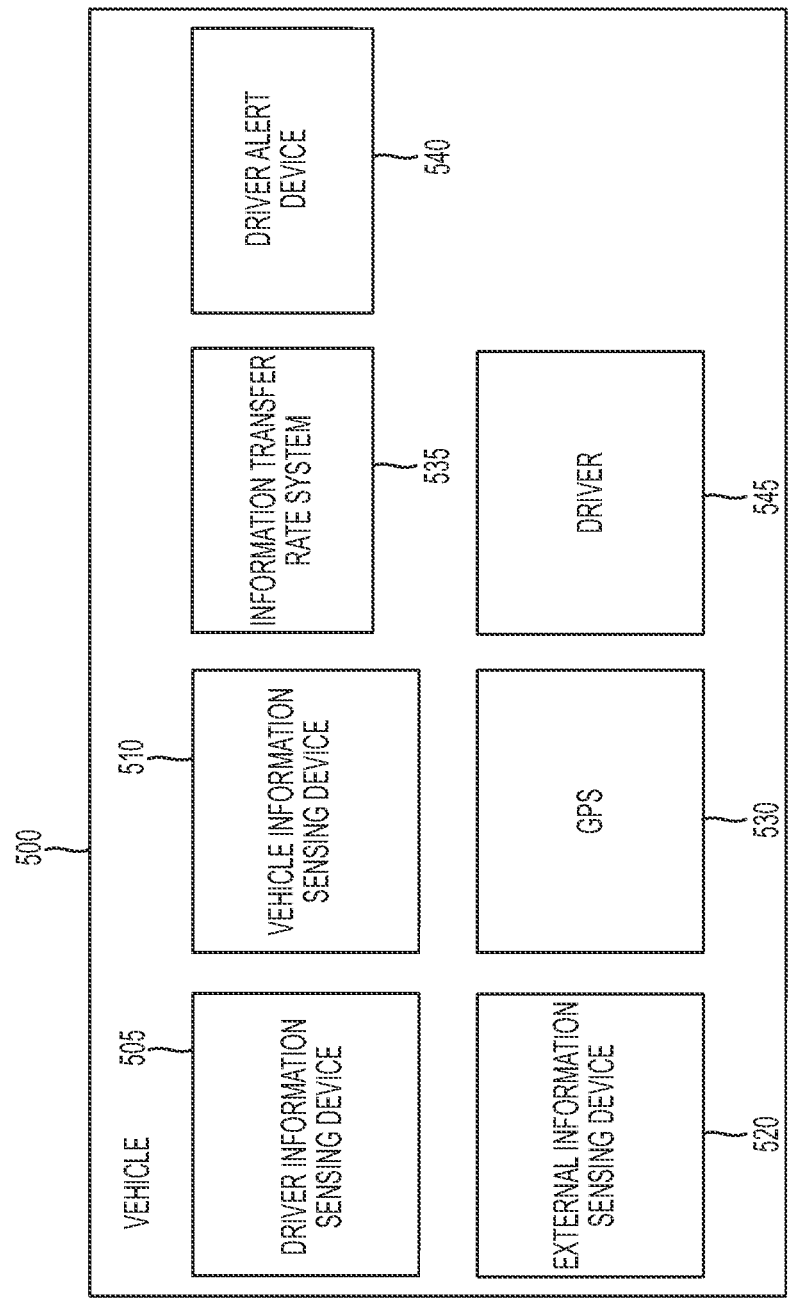
FIG. 1 is a schematic view of a vehicle having an information transfer rate system for determining the information transfer rate between a driver and vehicle according to an exemplary embodiment.

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "database", as used herein can refer to table, a set of tables, a set of data stores and/or methods for accessing and/or manipulating those data stores.

An "output device" as used herein can include devices that can derive from vehicle components, systems, subsystems, and electronic devices. The term "output devices" includes, but is not limited to: display devices, and other devices for outputting information and functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

System Overview

Referring now to the drawings, wherein the showings are for purposes of illustrating one or more exemplary embodiments and not for purposes of limiting same, in FIG. 1, there is shown a schematic view of a vehicle 500 having an information transfer rate system 535 for determining the information transfer rate between a driver 545 and vehicle 500 according to an exemplary embodiment. In one embodiment, the vehicle 500 comprises a driver information sensing device 505, a vehicle information sensing device 510, an information transfer rate system 535, a driver alert device 540, a GPS 530, and optionally an external information sensing device 520. Note that the vehicle 500 can include components other than those illustrated in FIG. 1 and further note that some components of a vehicle 500 such as the engine, tires, and suspension are omitted for brevity purposes.

Controlling a vehicle 500 requires a constant flow of information from the driver 545 to the vehicle 500 in accordance with road and traffic conditions. To control the vehicle 500, the driver 545 must transmit information by way of one or more driver control input devices to produce appropriate changes in vehicle acceleration, velocity, lane position, and direction. Driver control input devices (not shown) include, but are not limited to, a steering wheel, accelerator pedal, and brake pedal. Thus, a reduction in information transfer from the driver 545 to the vehicle 500 can signal a reduction in vehicular control, as could be the case with a driver 545 who is distracted, drowsy, intoxicated or experiencing a medical emergency.

In one embodiment, the driver information sensing device 505 can measure driver information directly from the driver 545, such as biometric data and direct driver control input device data. Driver biometric data can include one or more types of driver biometric data, including, but not limited to, eyelid aperture, pupil diameter, head position, gaze direction, eye blink rate, respiratory rate, heart rate, hand position, aortic blood flow, leg position, and brain electrical activity. Direct driver control input device data can include data from one or more types of driver control input devices, such as, but not limited to, the steering wheel, brake pedal, and gas pedal of vehicle 500. Accordingly, the direct driver control input device data, can include, but is not limited to, one or more of the position of the vehicle steering wheel, turn velocity of the steering wheel, turn acceleration of the steering wheel, position of the vehicle gas pedal, velocity of the gas pedal, acceleration of the gas pedal, position of the vehicle brake pedal, velocity of the brake pedal, and acceleration of the brake pedal.

It is contemplated that in some embodiments, one driver information sensing device 505 can be used to measure one or more types of driver information directly from the driver 545. In other embodiments, multiple driver information sensing devices 505 can be used to measure multiple types of driver information directly from the driver 545. For example, in one embodiment, driver information sensing device 505 can include an electroencephalograph for measuring the driver brain electrical activity. In another embodiment, one driver information sensing device 505 can include a camera for measuring the driver eyelid aperture, the gas pedal for measuring the position of the vehicle gas pedal, and the brake pedal for measuring the position of the vehicle brake pedal, and so forth.

Further, in other embodiments, the driver information sensing device 505 can be a camera for measuring the driver eyelid aperture, another driver information sensing device 505 can be a driver control input device, such as the vehicle gas pedal, or a component of the gas pedal, for measuring the position of the gas pedal, and an additional driver information sensing device 505 can be another driver control input device, such as the vehicle brake pedal, or a component of the brake pedal, for measuring the position of the brake pedal. In other embodiments, driver information sensing device 505 can be comprised of one or more of a contact and/or contactless sensors and can include electric current/potential sensors (e.g., proximity, inductive, capacitive, electrostatic), subsonic, sonic, and ultrasonic sensors, vibration sensors (e.g., piezoelectric) visual, photoelectric, oxygen sensors, as well as any other kinds of devices, sensors, or systems that are capable of measuring driver information directly from the driver 545.

In one embodiment, the vehicle information sensing device 510 can measure vehicle information directly from a vehicle system of vehicle 500. For example, the vehicle information sensing device 510 can measure vehicle information directly from the vehicle 500, such as the lane position, lane deviation, linear and angular vehicle position, velocity and acceleration, distance from potential obstacles in front of, beside and behind the vehicle 500, reliance on cruise control, reliance on assisted steering and reaction to known obstacles, such as construction barricades, traffic signals, and stopped vehicles.

As with the driver information sensing device 505, in some embodiments, one vehicle information sensing device 510 can be used to measure one or more types of vehicle information directly from the vehicle 500. In other embodiments, multiple vehicle information sensing devices 510 can be used to measure multiple types of vehicle information. For example, in one embodiment, the vehicle information sensing device 510 can include a camera for measuring lane position of the vehicle 500 and an accelerometer for measuring the acceleration of the vehicle 500. In further embodiments, the vehicle information sensing device 510 can be a camera for measuring lane position of the vehicle 500, another vehicle information sensing device 510 of the vehicle 500 can be an accelerometer for measuring the acceleration of the vehicle 500, and a third vehicle information sensing device 510 can be an ultrasonic detector for measuring the distance from the vehicle 500 to any potential obstacles located around the vehicle 500.

The driver alert device 540 is used to alert the driver 545 if a reduction in vehicle control occurs, namely if the driver safety factor, discussed below, does not exceed a predetermined driver safety alert threshold, discussed below, due to a low information transfer rate between the driver 545 and the vehicle 500. The driver alert device 540 can be an output device of the vehicle 500 that outputs a visual, mechanical, or audio signal to alert the driver 545 to the reduction in vehicle control, which would allow the driver 545 to take action, such as pulling the vehicle 500 over, stopping the vehicle 500, or swerving the vehicle 500.

The external information sensing device 520 can be used to measure information external to the vehicle 500, and thus the flow of information from the driver 545 to the vehicle 500 in reaction to the external information. The external information sensing device 520 can measure external information, such as, but not limited to, adjacent vehicles, road construction barricades, stopped traffic, animals, and pedestrians. It is contemplated that in some embodiments, one external information sensing device 520 can be used to measure one or more types of external information. In other embodiments, multiple external information sensing devices 520 can be used to measure multiple types of external information. For example, in one embodiment, the external information sensing device 520 can include a camera to sense an animal external to the vehicle 500, an inter-vehicular communication system for sensing other vehicles adjacent to the vehicle 500, and an ultrasonic proximity sensor for sensing objects near the vehicle 500. In another embodiment, one external information sensing device 520 can include a camera to sense an animal external to the vehicle 500, another external information system can include an inter-vehicular communication system for sensing other vehicles adjacent to the vehicle 500, and another external information system can include an ultrasonic proximity sensor for sensing objects near the vehicle 500.

The GPS 530 can optionally be present in the vehicle 500 and can be used to obtain the location, weather, and time of day traffic conditions at the location of the vehicle 500 for use during the normalization process of the information transfer rate between the driver 545 and the vehicle 500, in embodiments of the information transfer rate system 535, which normalize such information. It is recognized that normalizing the information transfer rate between the driver 545 and the vehicle 500 can be necessary due to the fact that a higher information transfer rate is required to maintain control of vehicle 500 in some driving conditions and a lower information transfer rate is required to maintain control of the vehicle 500 in other driving conditions. For example, curvy inner city roads during rush hour on snowy days require a higher information transfer rate from the driver 545 to the vehicle 500 to maintain control of the vehicle 500, than will long straight desolate roads in fair weather.

Figure 2:
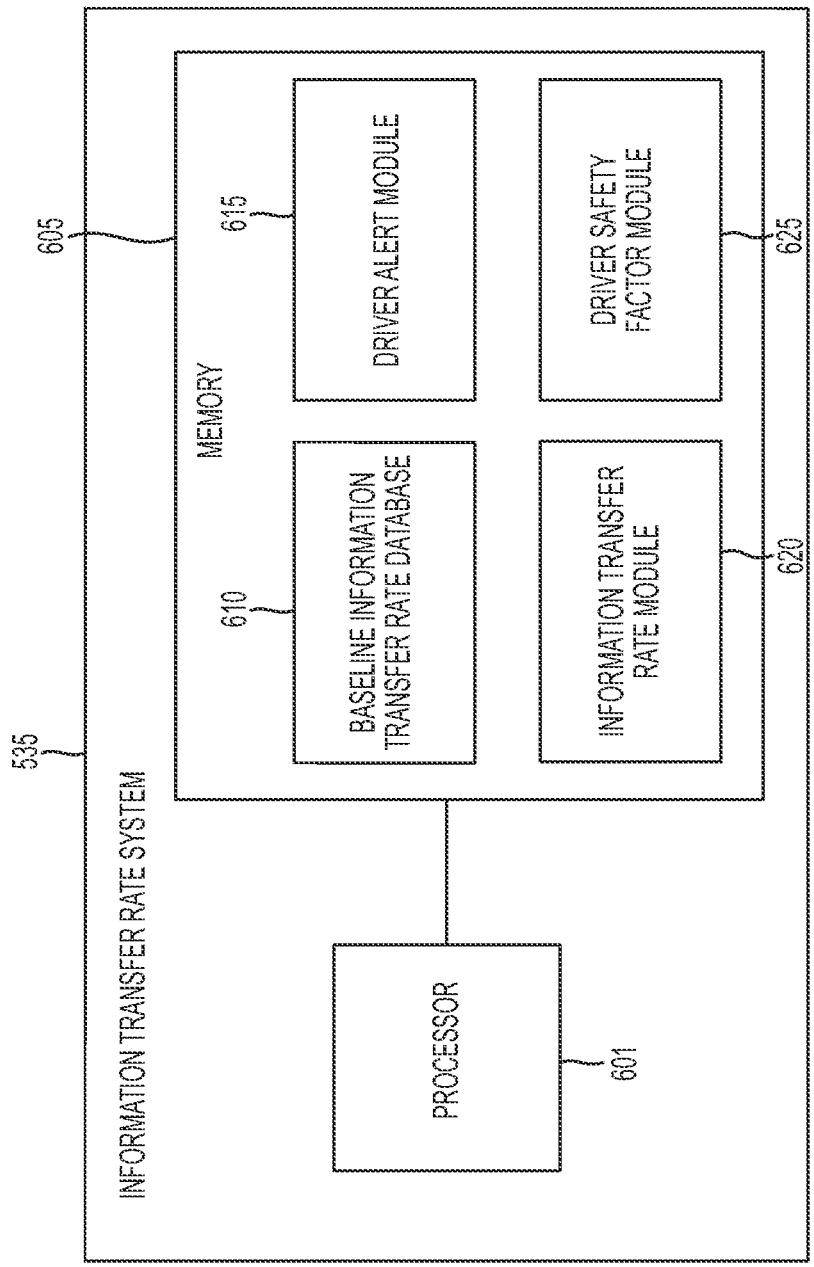
FIG. 2 is a schematic view of an information transfer rate system of FIG. 1 for determining the information transfer rate between a driver and vehicle according to an exemplary embodiment.

Turning now to FIG. 2, there is shown a schematic detailed view of an information transfer rate system 535 for determining the information transfer rate between a driver 545 and vehicle 500 according to an exemplary embodiment, which will be described with reference to the elements of FIG. 1. The information transfer rate system 535 comprises a computer processor 601 and a memory 605. Note that the information transfer rate system 535 comprises features, such as communication interfaces to the driver information sensing device 505, vehicle information sensing device 510, driver alert device 540, GPS 530, and optional external information sensing device 520 (FIG. 1). However, illustration of these features has been omitted for brevity purposes. Note that in other embodiments, the information transfer rate system 535 can also comprise additional features other than those illustrated in FIGS. 1 and 2.

In one embodiment, the processor 601 processes data signals and can comprise various computing architectures including a complex instruction set computer (CISC) architecture, a reduced instruction set computer (RISC) architecture, or an architecture implementing a combination of instruction sets. Although only a single processor is shown in FIG. 2, multiple processors can be included. The processor 601 can comprise an arithmetic logic device, a microprocessor, a general purpose computer, or some other information appliance equipped to transmit, receive, and process non-transitory electronic data signals from the memory 605, the driver information sensor device 505, the vehicle information sensing device 510, the driver alert device 540, the GPS 530, and the external information sensing device 520.

In one embodiment, the memory 605 stores instructions and/or data that can be executed by the processor 601. The instructions and/or data can comprise code (i.e. modules) for performing and and/or all of the techniques described herein. In one embodiment, the memory 605 comprises a baseline information transfer rate database 610, a driver alert module 615, an information transfer rate module 620, and a driver safety factor module 625. Note that in other embodiments, other modules than those shown in FIG. 2 can be used to perform the functionality described herein. The modules are adapted to communicate, via a bus (not shown), with the processor 601, the driver information sensing device 505, the vehicle information sensing device 510, the driver alert device 540, the GPS 530, and the optional external information sensing device 520.

In one embodiment, the information transfer rate module 620 receives driver information measured directly from the driver 545 from the driver information sensing device 505 in the form of a driver time series calculated according to the following equation:

$$D_x = \{d_{x1}, d_{x2} \ldots d_{xN}\} \quad (1)$$

where: $D_x$ is a time series which is an ordered collection of real values of driver information measured directly from the driver 545 using the driver information sensing device 505, and $d_x$ is a time series segment of a real value of driver information measured directly from the driver 545 using the driver information sensing device 505.

Further, the information transfer rate module 620 receives vehicle information measured directly from the vehicle 500 from the vehicle information sensing device 510 in the form of a vehicle time series calculated according to the following equation:

$$V_y = \{v_{y1}, v_{y2} \ldots v_{yN}\} \quad (2)$$

where: $V_y$ is a time series which is an ordered collection of real values of vehicle information measured directly from the vehicle using the vehicle information sensing device 510, and $v_y$ is a time series segment of a real value of vehicle information measured directly from the vehicle using the vehicle information sensing device 510.

The information transfer rate module 620 calculates an information transfer rate between the driver and vehicle using the vehicle information measured directly from the vehicle 500 by the vehicle information sensing device 510 and the driver information measured directly from the driver 545 by the driver information sensing device 505. The information transfer rate between the driver 545 and the vehicle 500 is calculated using conditional and transfer entropies. Conditional entropy quantifies the amount of information needed to describe the outcome of a random variable Y given that the value of another random variable X is known. Further, transfer entropy is a non-parametric statistic measuring the amount of directed (time-asymmetric) transfer of information between two random processes. Transfer entropy from a process X to another process Y is the amount of uncertainty reduced in future values of Y by knowing the past values of X given past values of Y. Thus, in one embodiment, the information transfer rate system 535 measures the reduction in uncertainty in V (vehicle) given historical segments of both V and D (driver) with respect to the reduction of uncertainty in V given only historical segments of V. In other words, the information transfer rate system 535 ascertains how much knowing D assists with determining V.

More specifically, in one embodiment, the information transfer rate between the driver 545 and the vehicle 500 is calculated according to the following equation:

$$T_{D_x \to V_y} = H(v_{yi} | v_{y(i-t)}^{(l)}) - H(v_{yi} | v_{y(i-t)}^{(l)}, d_{x(i-\tau)}^{(k)}) \quad (3)$$

where: $T_{D_x \to V_y}$ is a transfer entropy from a driver measurement x to a vehicle measurement y, $H(v_{yi}|v_{y(i-t)}^{(l)})$ is the conditional entropy between $v_{yi}$ and a prior segment of $V_y$ that is l points long and delayed by t points i.e. $v_{y(i-t)}^{(l)} = \{v_{y(i-t-l+1)}, v_{y(i-t-l+2)}, \ldots, v_{y(i-t)}\}$, and $H(v_{yi}|v_{y(i-t)}^{(l)}, d_{x(i-\tau)}^{(k)})$ is the conditional entropy between $v_i$ and a prior segment of $V_y$ further conditioned on a prior segment of $D_x$ that is k points long and delayed by $\tau$ time points i.e. $d_{x(i-\tau)}^{(k)} = \{d_{x(i-\tau-k+1)}, d_{x(i-\tau-k+2)}, \ldots, d_{x(i-\tau)}\}$. Note that further conditioning of $v_{yi}$ on $d_{x(i-\tau)}^{(k)}$ cannot increase the uncertainty in $v_i$ so $H(v_{yi}|v_{y(i-t)}^{(l)}) \geq H(v_{yi}|v_{y(i-t)}^{(l)}), d_{x(i-\tau)}^{(k)})$ and $T_{D_x \to V_y}$ is always greater than zero.

The information transfer rate module 620 can be configured to use all of the driver information and vehicle information separately or in combination to form various transfer information sums and calculate an information transfer rate between the driver and vehicle. For example, in one embodiment, a total information transfer $T_{D \to V}$ is calculated by the information transfer rate module 620 using the following equation:

$$T_{D \to V} = \Sigma_{x=1}^X \Sigma_{y=1}^Y H(v_{yi}|v_{y(i-t)}^{(l)}) - H(v_{yi}|v_{y(i-t)}^{(l)}, d_{x(i-\tau)}^{(k)}) \quad (4)$$

which is the total sum over every possible combination of all driver information measured directly from the driver 545 (X in total) by the driver information sensing device 505 and all vehicle measurements measured directly from the vehicle (Y in total) by the vehicle information sensing device 510 for a total of X*Y individual sums.

In other embodiments, the information transfer rate module 620 can be configured to use only some of the driver information and vehicle information separately or in combination to form various transfer information sums and calculate an information transfer rate between the driver and vehicle. For example, in one embodiment, a sum of the combinations of driver information measurements 3 through 5 measured directly from the driver 545 by the driver information sensing device 505 and vehicle measurements 2 through 6 measured directly from the vehicle 500 by the vehicle information sensing device 510, represented as $T_{D_{3-5} \to V_{2-6}}$, can be calculated by the information transfer module 620 using the following equation:

$$T_{D_{3-5} \to V_{2-6}} = \Sigma_{x=3}^5 \Sigma_{y=2}^6 H(v_{yi}|v_{y(i-t)}^{(l)}) - H(v_{yi}|v_{y(i-t)}^{(l)}, d_{x(i-\tau)}^{(k)}). \quad (5)$$

Thus, as can be seen, the information transfer rate between the driver 545 and the vehicle 500 is calculated by the information transfer rate module 620 using entropy. More specifically, the transfer rate is calculated by information transfer rate module 620, using transfer entropy and conditional entropy. Each of equations 3-5, discussed above, provide an information transfer rate between the driver 545 and the vehicle 500 using transfer entropy and conditional entropy.

In some embodiments, information transfer rate module 620 also uses the external measurements, measurements of information external to the vehicle 500, provided by external information sensing device 520 to calculate the information transfer rate between the driver and vehicle.

In some embodiments, the information transfer rate module 620 normalizes the calculated information transfer rate based on at least one of the type of driver information measured directly from the driver 545 and the driving conditions. The driving conditions include at least one of a particular road condition, weather condition, time of day, and traffic condition. Further, in some embodiments, the information transfer rate module 620 also uses the information provided by the GPS 530 of the vehicle 500 to normalize the information transfer rate for the driving conditions. In one embodiment, the information transfer rate module 620 determines the maximum information transfer rate by adjusting the parameters t, $\tau$, k, l of the above discussed equations to determine the maximum information transfer rate between the driver 545 and the vehicle 500. Specifically, in one embodiment, the parameters t, $\tau$, k, l are adjusted based on at least one of a type of driver information measured directly from the driver 545 and the driving conditions. The driving conditions include at least one of a particular road condition, a weather condition, a time of day, and a traffic condition.

In some embodiments, the information transfer rates between the driver and vehicle for all driver measurements and all vehicle measurements are calculated by the information transfer rate module 620, tracked by the processor 601, and stored in the memory 605 to establish personal normatives for each driver 545 of the vehicle 500. These personal normatives are then stored in the baseline information transfer rate database 610 as baseline information transfer rate values for the driver 545, for retrieval and use by the driver safety factor module 625.

In one embodiment, the baseline information transfer rate database 610 contains baseline information transfer rate values for maintaining control of the vehicle 500. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions.

In one embodiment, the driver safety factor module 625 calculates a driver safety factor for the driver 545 of the vehicle 500 in real time. The driver safety factor is the ratio of the rate of information transfer between the driver and vehicle calculated by the information transfer rate module 620 and the baseline information transfer rate retrieved from the baseline information transfer rate database 610 by the driver safety factor module 625. In the event that baseline information transfer rate database 610 contains multiple baseline information transfer rates for the driver 545 of vehicle 500, the driver safety factor module 625 retrieves the baseline information transfer rate that most closely matches the real time road conditions for the road on which the vehicle 500 is travelling.

In one embodiment, the driver alert module 615 compares the driver safety factor calculated by the driver safety factor module 625 to a predetermined driver safety alert threshold. In the event that the calculated driver safety factor does not exceed the predetermined driver safety alert threshold, an alert is issued to the driver 545 using the driver alert device 540, as discussed above. The alert signals to the driver 545 that the real time information transfer rate between the driver and vehicle has fallen below the information transfer rate necessary for the driver 545 to maintain suitable control of the vehicle 500 given the present road conditions.

With additional reference to FIG. 2, the information transfer rate system 535 can include the processor 601 and the memory 605. The system 535 can further include the baseline information transfer rate database 610, the driver alert module 615, the information transfer rate module 620, and the driver safety factor module, each of which can be stored in the memory 605. The baseline information transfer rate database 610 can include baseline information transfer rates between the driver 545 and the vehicle 500 that are necessary for control of the vehicle 500 under a given set of road conditions.

The information transfer rate module 620 calculates the actual information transfer rate between the driver 545 and the vehicle 500 using the information transfer rate module 620. The information transfer rate module 620 also compares the baseline rate for the real time conditions of the vehicle 500 to the actual information transfer rate between the driver 545 and the vehicle 500 in real time. From this comparison, it can be determined if a driver 545 is in suitable control of the vehicle 500.

The driver safety factor module 625 can calculate a real time driver safety factor, which is the ratio of the calculated rate of information transfer to a predetermined information transfer rate. The driver alert module 615 compares the calculated real time driver safety factor to a predetermined driver safety alert threshold. The driver alert module 615 provides an alert to the driver 545 if the calculated real time driver safety factor is low. A calculated real time driver safety factor is low if the calculated real time driver safety factor does not exceed the predetermined driver safety alert threshold, when the comparison is performed by the driver alert module 615. The driver alert module 615 alerts the driver 545, using the driver alert device 540, when the calculated real time driver safety factor is low, thereby alerting to the presence of an impaired driver 545.

Figure 3:
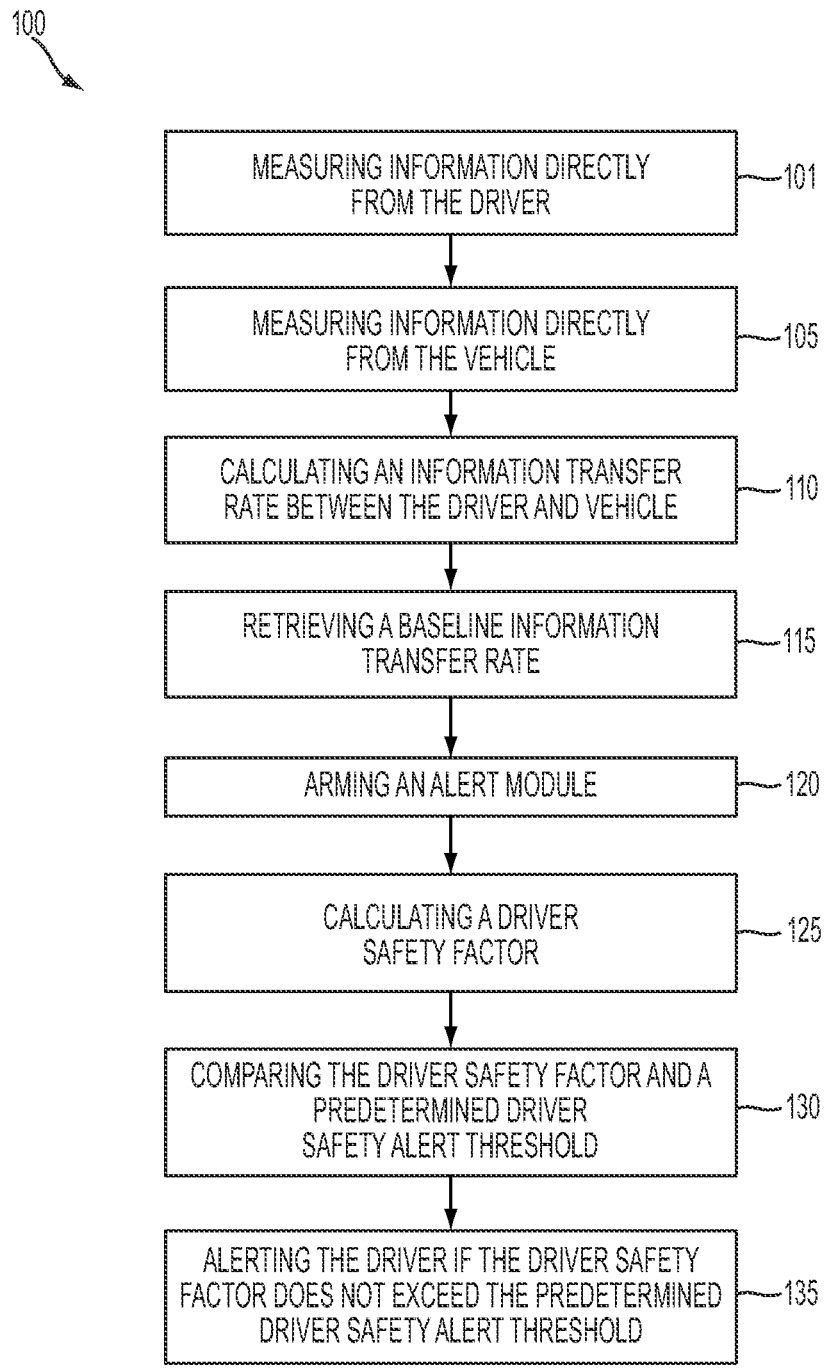
FIG. 3 is a process flow diagram of a method for determining an information transfer rate between a driver and vehicle according to an exemplary embodiment.

With reference to FIG. 3, a process flow diagram of a method 100 for determining an information transfer rate between a driver 545 and a vehicle 500 according to an exemplary embodiment is shown. The method of FIG. 3 will be described with reference to FIGS. 1 and 2, though the method of FIG. 3 can also be used with other systems and embodiments.

In step 101 of FIG. 3, driver information is measured directly from the driver 545. In one embodiment, this driver information is measured using the driver information sensing device 505, as described above. In step 105, vehicle information is measured directly from the vehicle 500. In one embodiment, this vehicle information is measured using the vehicle information sensing device 510, as described above.

In step 110, an information transfer rate between the driver 545 and the vehicle 500 is calculated using the driver information measured directly from the driver 545 in step 101 and the vehicle information measured directly from the vehicle in step 105. In one embodiment, this information transfer rate is calculated using the information transfer rate module 620, as described above. Thus, as can be seen, the information transfer rate between the driver 545 and the vehicle 500 is calculated using entropy. More specifically, in some embodiments, the transfer rate is calculated, using transfer entropy and conditional entropy, as is shown above in each of equations 3-5.

At step 115, a baseline information transfer rate is retrieved from the baseline information transfer rate database 610 by the driver safety factor module 625. As was stated above, in one embodiment, the baseline information transfer rate database 610 contains baseline information transfer rate values for maintaining vehicular control. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions. In the event that the baseline information transfer rate database 610 has multiple information transfer rates for the driver 545 of vehicle 500, the driver safety factor module 625 retrieves the baseline information transfer rate that most closely matches the real time road conditions for the road on which the vehicle 500 is travelling.

In step 120, once the baseline information transfer rate is retrieved from the baseline information transfer rate database 610, a driver alert module 615 is armed. Information transfer rate system 535 arms driver alert module 615 after a baseline information transfer rate is retrieved from the baseline information transfer database 610 by the driver safety factor module. Upon arming, driver alert module 615 is prepared to compare a predetermined driver safety alert threshold, stored in memory 605, to the driver safety factor calculated by the driver safety factor module 625. Driver alert module 615 performs the comparison when the driver safety factor calculated by the driver safety factor module 625 is provided to the driver alert module 615 by driver safety factor module 625.

At step 125, a driver safety factor is calculated. In one embodiment, the driver safety factor is the ratio of the calculated rate of information transfer to a predetermined information transfer rate. In one embodiment, the driver safety factor is calculated by the driver safety factor module 625, as described above, using the information transfer rate calculated in step 110 and the baseline information transfer rate retrieved from the baseline information transfer rate database 610 in step 115.

In step 130, the driver safety factor calculated in step 125 is compared to a predetermined driver safety alert threshold. In one embodiment, this comparison is performed by the driver alert module 615, as described above. In step 135, the driver 545 is alerted if the driver safety factor value does not exceed the predetermined driver safety alert threshold value. The driver safety factor and predetermined driver safety alert threshold data type can be, but is not limited to, numeric, non-numeric, discrete, or continuous. In one embodiment, if the comparison made by the driver alert module 615 in step 130 indicates that the driver safety factor does not exceed the predetermined driver safety alert threshold, then the driver 545 is alerted using the driver alert device 540, as described above.

Figure 4:
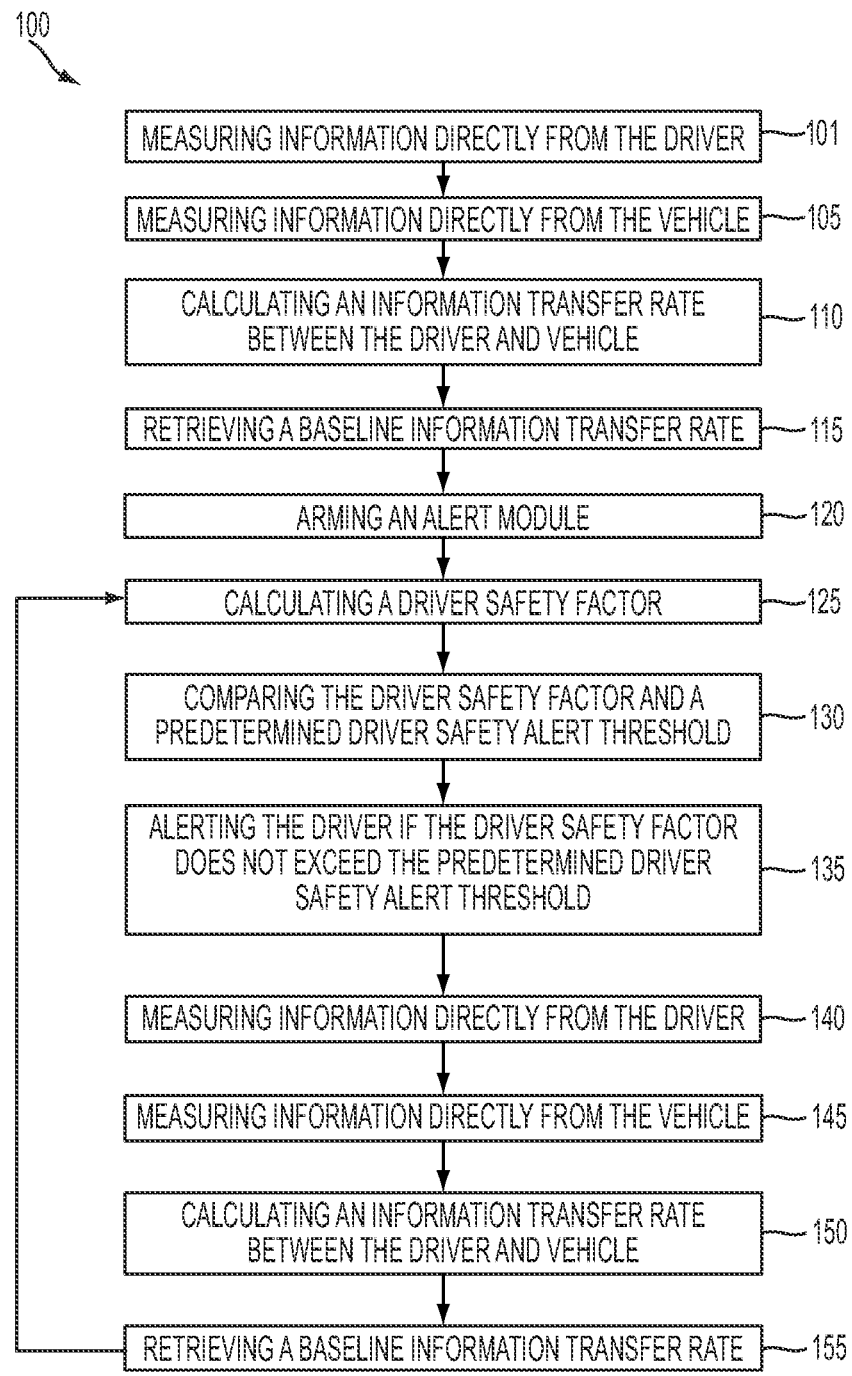
FIG. 4 is a process flow diagram of a real time continuously repeating method for determining an information transfer rate between a driver and vehicle according to an exemplary embodiment.

With reference to FIG. 4, a process flow diagram of a method 100 for determining an information transfer rate between a driver 545 and a vehicle 500 according to an exemplary embodiment is shown. The method of FIG. 4 will be described with reference to FIGS. 1, 2 and 3, though the method of FIG. 4 can also be used with other systems and embodiments. FIG. 4 contains additional steps beyond those shown in FIG. 3, namely steps 140 to 155, which clearly show how this method is continuously repeated in real time by the information transfer rate system 535 while the vehicle 500 is travelling.

In the embodiment shown in FIG. 4, after step 135, driver information is again measured directly from the driver 545 in step 140. In one embodiment, this driver information is measured using the driver information sensing device 505, as described above. Following step 140, vehicle information is measured directly from the vehicle 500 again in step 145. In one embodiment, this vehicle information is measured using the vehicle information sensing device 510, as described above.

In step 150, an information transfer rate between the driver 545 and the vehicle 500 is again calculated using the driver information measured directly from the driver 545 in step 140 and the vehicle information measured directly from the vehicle 500 in step 145. In one embodiment, this information transfer rate is calculated using the information transfer rate module 620, as described above.

Following step 150, a baseline information transfer rate is once again retrieved from the baseline information transfer rate database 610 and provided to the driver safety factor module 625 in step 155, as described above. As was stated above, in one embodiment, the baseline information transfer rate database 610 contains baseline information transfer rate values for maintaining vehicular control. In some embodiments, the baseline information transfer rate database 610 only contains one baseline information transfer rate value. In other embodiments, the baseline information transfer rate database 610 contains at least two different baseline information transfer rate values for the driver 545, with each value adjusted for road conditions. Road conditions can include, but are not limited to, one or more of type of road, weather, time of day, and traffic conditions. In the event that the baseline information transfer rate database 610 has multiple information transfer rates for the driver 545 of the vehicle 500, the driver safety factor module 625 retrieves the baseline information transfer rate that most closely matches the real time road conditions for the road on which the vehicle 500 is travelling.

After the baseline information transfer rate is retrieved from the baseline information transfer rate database 610 and provided to the driver safety factor module 625 in step 155, the method returns to step 125.

Figure 5:
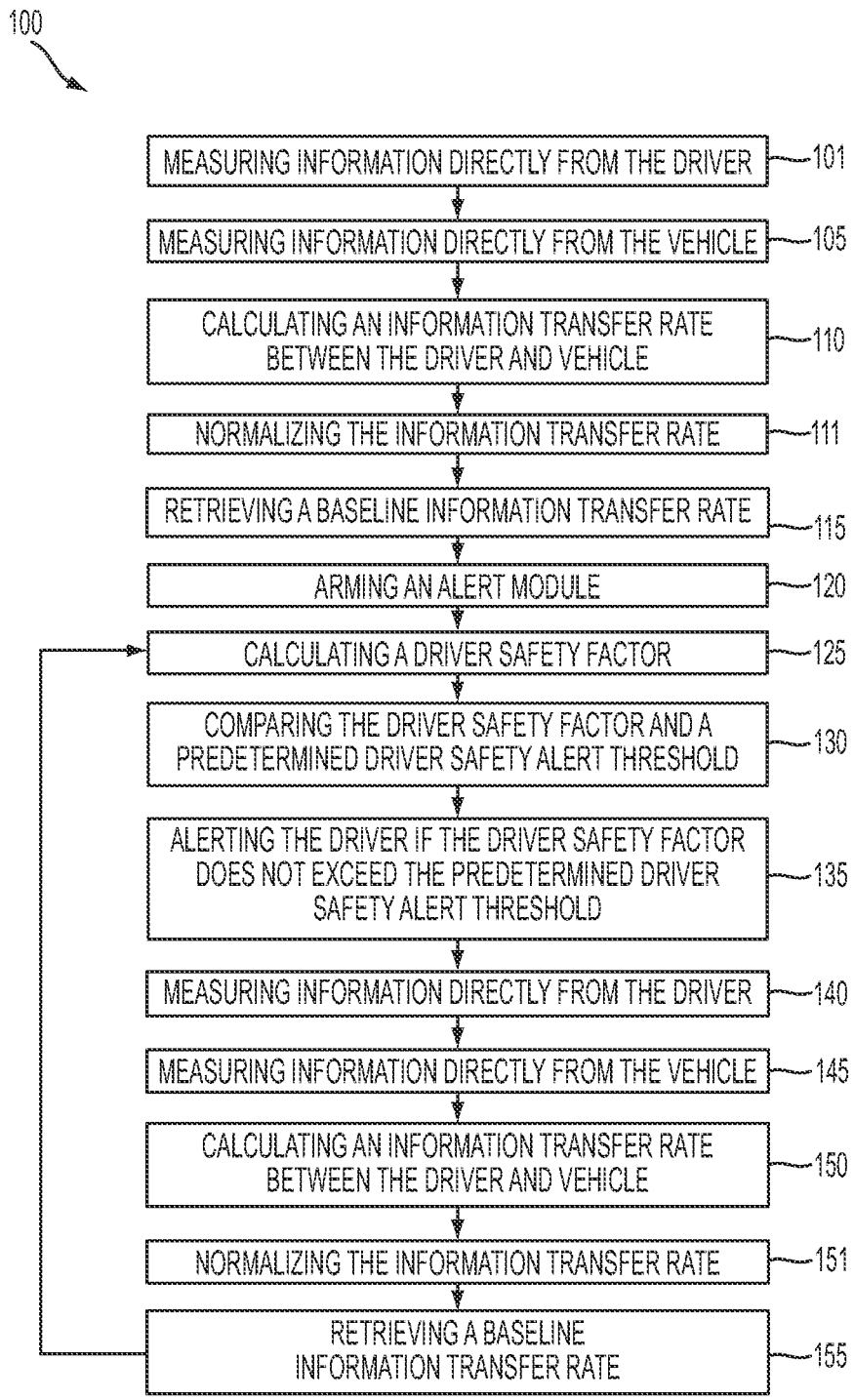
FIG. 5 is a process flow diagram of a method for determining a normalized information transfer rate between a driver and vehicle according to an exemplary embodiment.

With reference to FIG. 5, a process flow diagram of a method 100 for determining an information transfer rate between a driver 545 and a vehicle 500 according to an exemplary embodiment is shown. The method of FIG. 5 will be described with reference to FIGS. 1, 2, 3, and 4 though the method of FIG. 5 can also be used with other systems and embodiments. FIG. 5 contains additional steps beyond those shown in FIGS. 3 and 4, namely steps 111 and 151.

In the embodiment shown in FIG. 5, the information transfer rate between the driver 545 and vehicle 500 calculated in step 110 by information transfer rate module 620 is normalized in step 111 by the information transfer rate module 620, as was discussed above, based on at least one of a type of driver information measured directly from the driver 545 and the driving conditions. The driving conditions include, but are not limited to, at least one of a particular road condition, a weather condition, a time of day, and a traffic condition. Further, in some embodiments, the information transfer rate module 620 also uses the information provided by the GPS 530 of the vehicle 500 to normalize the information transfer rate for the driving conditions.

Similarly, in step 151 of FIG. 5, the information transfer rate between the driver 545 and vehicle 500 calculated in step 150 by information transfer rate module 620 is normalized in step 151 by information transfer rate module 620, as was discussed above, based on at least one of a type of driver information measured directly from the driver 545 and the driving conditions. The driving conditions include, but are not limited to, at least one of a particular road condition, a weather condition, a time of day, and a traffic condition. Further, in some embodiments, the information transfer rate module 620 also uses the information provided by the GPS 530 of the vehicle 500 to normalize the information transfer rate for the driving conditions.

Figure 6:
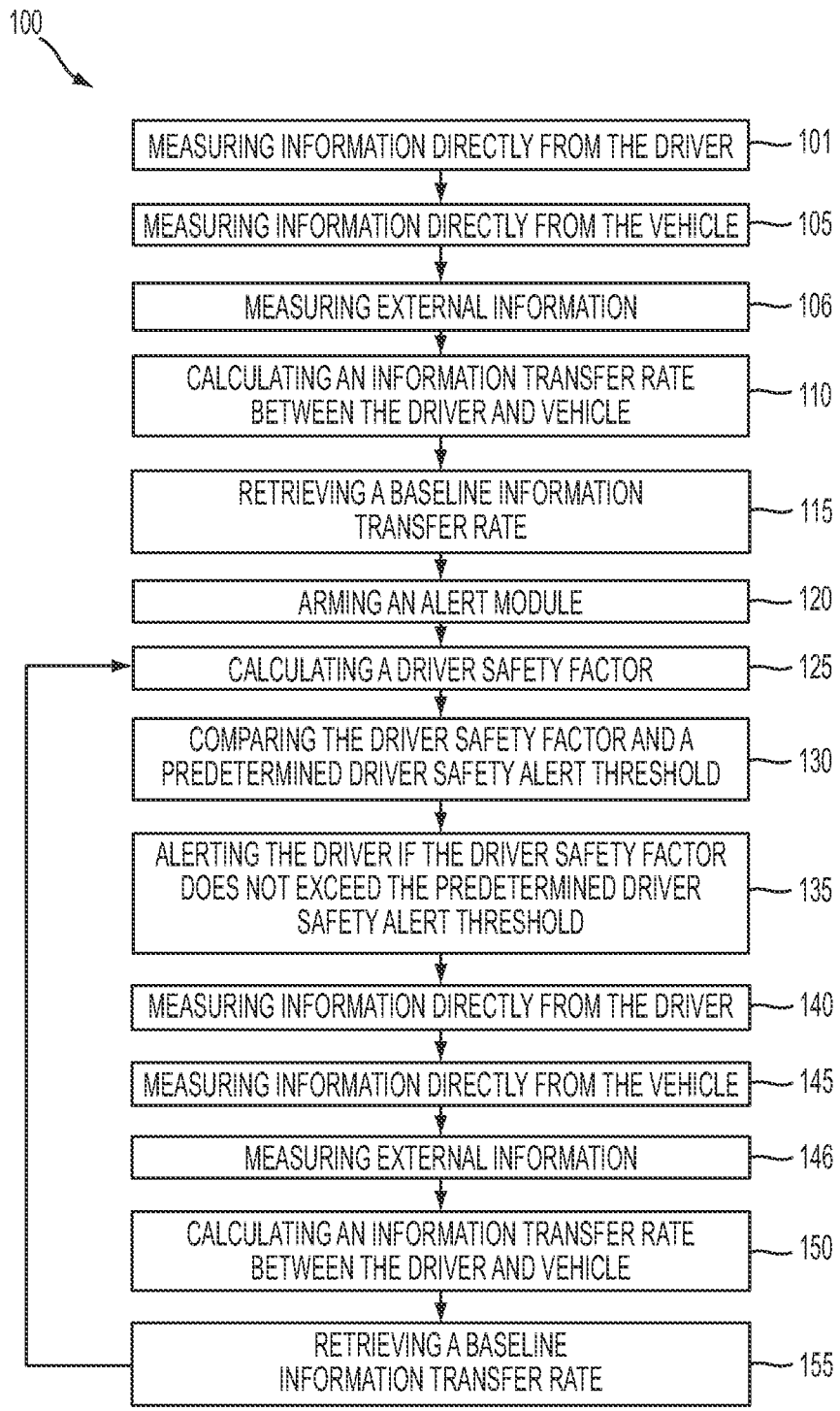
FIG. 6 is a process flow diagram of a method for determining an information transfer rate between a driver and vehicle using external information according to an exemplary embodiment.

With reference to FIG. 6, a process flow diagram of a method 100 for determining an information transfer rate between a driver 545 and a vehicle 500 according to an exemplary embodiment is shown. The method of FIG. 6 will be described with reference to FIGS. 1, 2, 3, 4, and 5 though the method of FIG. 6 can also be used with other systems and embodiments. FIG. 6 contains additional steps beyond those of the embodiments of the method 100 shown in FIGS. 3-5, namely steps 106 and 146. Note that in other embodiments, other steps can be performed than those illustrated in FIG. 6.

In step 106, external information is measured external of the vehicle 500. In one embodiment, this external information is measured using the external information sensing device 520, as described above. This external information is used by the information transfer rate module 620 in step 110, in conjunction with the driver information measured in step 101 and the vehicle information measured in step 105, to calculate an information transfer rate between the driver 545 and vehicle 500 in step 110, as described above.

Similarly, in step 146, external information is measured external of the vehicle 500. In one embodiment, this external information is measured using the external information sensing device 520, as described above. This external information is used by the information transfer rate module 620 in step 150, in conjunction with the driver information measured in step 140 and vehicle information measured in step 145, to calculate an information transfer rate between the driver 545 and vehicle 500 in step 150, as described above.

Thus, disclosed above are embodiments of a system and method for calculating the information transfer rate between the driver 545 and the vehicle 500 by information transfer module 620 using information measured directly from the driver 545 and information measured directly from the vehicle 500. The information transfer rate is calculated in real time using conditional and transfer entropies. The calculated information transfer rate is used to determine if the driver 545 of vehicle 500 is in suitable control of vehicle 500 or the driver 545 is experiencing an impairment that prevents the driver 545 from having suitable control of vehicle 500.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A computer implemented method for determining an information transfer rate between a driver and a vehicle, the method comprising:
   measuring driver information directly from the driver;
   measuring vehicle information directly from the vehicle;
   calculating an information transfer rate between the driver and the vehicle using the driver information measured directly from the driver and the vehicle information measured directly from the vehicle, wherein the information transfer rate is calculated as a transfer entropy from the driver information to the vehicle information;
   retrieving a baseline information transfer rate for maintaining control of the vehicle from a baseline information transfer rate database; and
   calculating a driver safety factor using the information transfer rate between the driver and the vehicle and the baseline information transfer rate.

2. The computer implemented method of claim 1, wherein the method further comprises:
   comparing the driver safety factor and a predetermined driver safety alert threshold; and
   alerting the driver using a driver alert device if the driver safety factor does not exceed the predetermined driver safety alert threshold.

3. The computer implemented method of claim 1, wherein measuring the driver information directly from the driver includes calculating a driver time series according to the following equation:

$$D_x = \{d_{x1}, d_{x2} \ldots d_{xN}\}$$

where: $D_x$ is a time series which is an ordered collection of real values of driver information measured directly from the driver, and $d_x$ is a time series segment of a real value of driver information measured directly from the driver; and wherein measuring the vehicle information directly from the vehicle includes calculating a vehicle time series according to the following equation:

$$V_y = \{v_{y1}, v_{y2} \ldots v_{yN}\}$$

where: $V_y$ is a time series which is an ordered collection of real values of vehicle information measured directly from the vehicle, and $v_y$ is a time series segment of a real value of vehicle information measured directly from the vehicle.

4. The computer implemented method of claim 3, wherein the information transfer rate between the driver and the vehicle is calculated using conditional entropies according to the following equation:

$$T_{D_x \to V_y} = H(v_{yi}|v_{y(i-t)}^{(l)}) - H(v_{yi}|v_{y(i-t)}^{(l)}, d_{x(i-\tau)}^{(k)})$$

where:
$T_{D_x \to V_y}$ is a transfer entropy from a driver measurement x to a vehicle measurement y,
$H(v_{yi}|v_{y(i-t)}^{(l)})$ is the conditional entropy between $v_{yi}$ and a prior segment of $V_y$ that is l points long and delayed by t points, and
$H(v_{yi}|v_{y(i-t)}^{(l)}, d_{x(i-\tau)}^{(k)})$ is the conditional entropy between $v_i$ and a prior segment of $V_y$ further conditioned on a prior segment of $D_x$ that is k points long and delayed by τ time points.

5. The computer implemented method of claim 3, wherein parameters t, τ, k, l are adjusted to determine the maximum information transfer rate between the driver and vehicle.

6. The computer implemented method of claim 1, wherein the driver information measured directly from the driver includes at least one of driver biometric data and direct driver control input device data.

7. The computer implemented method of claim 1, wherein calculating the information transfer rate between the driver and the vehicle includes using external measurements, wherein the external measurements are obtained using at least one of a camera system, an inter-vehicular communication system, or an ultrasonic proximity sensor.

8. The computer implemented method of claim 1, further including normalizing the information transfer rate between the driver and the vehicle based on at least one of a type of driver information measured directly from the driver and driving conditions.

9. The computer implemented method of claim 8, wherein normalizing further includes a GPS of the vehicle being used to normalize the information transfer rate between the driver and the vehicle for the type of driver information measured directly from the driver and driving conditions,
wherein the driving conditions include at least one of a particular road condition, a weather condition, a time of day, and a traffic condition.

10. The computer implemented method of claim 1, wherein the baseline database contains at least two baseline information transfer rates for the driver, and wherein each of the baseline information transfer rates is for a different road condition.

11. A non-transitory computer-readable storage medium storing executable code for determining an information transfer rate between a driver and a vehicle, the code when executed performs the steps comprising:

measuring driver information directly from the driver;
measuring vehicle information directly from the vehicle;
calculating an information transfer rate between the driver and the vehicle using the driver information measured directly from the driver and the vehicle information measured directly from the vehicle wherein the information transfer rate is calculated by comparing a time series of the driver information to a time series of the vehicle information;
retrieving a baseline information transfer rate for maintaining control of the vehicle from a baseline information transfer rate database; and
calculating a driver safety factor using the information transfer rate between the driver and the vehicle and the baseline information transfer rate.

12. The non-transitory computer-readable storage medium of claim 11, the code when executed further performs the steps comprising:
comparing the driver safety factor and a predetermined driver safety alert threshold; and
alerting the driver using a driver alert device if the driver safety factor does not exceed the predetermined driver safety alert threshold.

13. The non-transitory computer-readable storage medium of claim 11,
wherein measuring the driver information directly from the driver includes calculating the time series or the driver information as a driver time series according to the following equation:

$$D_x = \{d_{x1}, d_{x2} \ldots d_{xN}\}$$

where: $D_x$ is a time series which is an ordered collection of real values of driver information measured directly from the driver, and $d_x$ is a time series segment of a real value of driver information measured directly from the driver; and wherein measuring the vehicle information directly from the vehicle includes calculating the time series of the vehicle information as a vehicle time series according to the following equation:

$$V_y = \{v_{y1}, v_{y2} \ldots v_{yN}\}$$

where: $V_y$ is a time series Which is an ordered collection of real values of vehicle information measured directly from the vehicle, and $v_y$ is a time series segment of a real value of vehicle information measured directly from the vehicle.

14. The non-transitory computer-readable storage medium of claim 13, wherein the information transfer rate between the driver and the vehicle is calculated using conditional entropies according to the following equation:

$$T_{D_x \to V_y} = H(v_{yi}|v_{y(i-t)}^{(l)}) - H(v_{yi}|v_{y(i-t)}^{(l)}, d_{x(i-\tau)}^{(k)})$$

where:
$T_{D_x \to V_y}$ is a transfer entropy from a driver measurement x to a vehicle measurement y,
$H(v_{yi}|v_{y(i-t)}^{(l)})$ is the conditional entropy between $v_{yi}$ and a prior segment of $V_y$ that is l points long and delayed by t points, and
$H(v_{yi}|v_{y(i-t)}^{(l)}, d_{x(i-\tau)}^{(k)})$ is the conditional entropy between $v_i$ and a prior segment of $V_y$ further conditioned on a prior segment of $D_x$ that is k points long and delayed by τ time points.

15. The non-transitory computer-readable storage medium of claim 11, wherein the driver information measured directly from the driver includes at least one of driver biometric data and direct driver control input device data.

16. An information transfer rate system for determining an information transfer rate between a driver and a vehicle, the system comprising:
- a computer processor; and
- a computer readable storage medium storing executable code when executed by the computer processor performs the steps comprising:
  - measuring driver information directly from the driver using a driver information sensing device;
  - measuring driver information directly from the vehicle using a vehicle information sensing device of the vehicle;
  - calculating an information transfer rate between the driver and the vehicle using the driver information measured directly from the driver and the vehicle information measured directly from the vehicle, wherein the information transfer rate is calculated using an information transfer rate module of the information transfer rate system;
  - retrieving a baseline information transfer rate for maintaining control of the vehicle from a baseline information transfer rate database of the information transfer rate system; and
  - calculating a driver safety factor using the information transfer rate between the driver and the vehicle and the baseline information transfer rate, wherein the driver safety factor is calculated using a driver safety factor module of the information transfer rate system.

17. The information transfer rate system of claim 16, the code when executed by the computer processor further performs the steps comprising:
- comparing the driver safety factor and a predetermined driver safety alert threshold using a driver alert module of the information transfer rate system; and
- alerting the driver using a driver alert device of the vehicle if the driver safety factor does not exceed the predetermined driver safety alert threshold.

18. The information transfer rate system of claim 16, wherein measuring the driver information directly from the driver includes calculating a driver time series according to the following equation:

$$D_x = \{d_{x1}, d_{x2} \ldots d_{xN}\}$$

where: $D_x$ is a time series which is an ordered collection of real values of driver information measured directly from the driver using the driver information Sensing device, and $d_x$ is a time series segment of a real value of driver information measured directly from the driver using the driver information sensing device; and wherein measuring the vehicle information directly from the vehicle includes calculating a vehicle time series according to the following equation:

$$V_y = \{v_{y1}, v_{y2} \ldots v_{yN}\}$$

where: $V_y$ is a time series which is an ordered collection of real values of vehicle information measured directly from the vehicle using the vehicle information sensing device, and $v_y$ is a time series segment of a real value of vehicle information measured directly from the vehicle using the vehicle information sensing device.

19. The information transfer rate system of claim 18, wherein the information transfer rate between the driver and the vehicle is calculated using conditional entropies according to the following equation:

$$T_{D_x \to V_y} = H(v_{yi}|v_{y(i-t)}^{(l)}) - H(v_{yi}|v_{y(i-t)}^{(l)}, d_{x(i-\tau)}^{(k)})$$

where:
- $T_{D_x \to V_y}$ is a transfer entropy from a driver measurement x to a vehicle measurement y,
- $H(v_{yi}|v_{y(i-t)}^{(l)})$ is the conditional entropy between $v_{yi}$ and a prior segment of $V_y$ that is l points long and delayed by t points, and
- $H(v_{yi}|v_{y(i-t)}^{(l)}, d_{x(i-\tau)}^{(k)})$ is the conditional entropy between $v_i$ and a prior segment of $V_y$ further conditioned on a prior segment of $D_x$ that is k points long and delayed by $\tau$ time points.

20. The information transfer rate system of claim 16, wherein the driver information measured directly from the driver using the driver information sensing device includes at least one of driver biometric data and direct driver control input device data.

* * * * *